June 23, 1931.   F. GROVER   1,811,751
MACHINE FOR WRAPPING CIGARS AND OTHER ELONGATED BODIES
Filed July 25, 1928   8 Sheets-Sheet 1
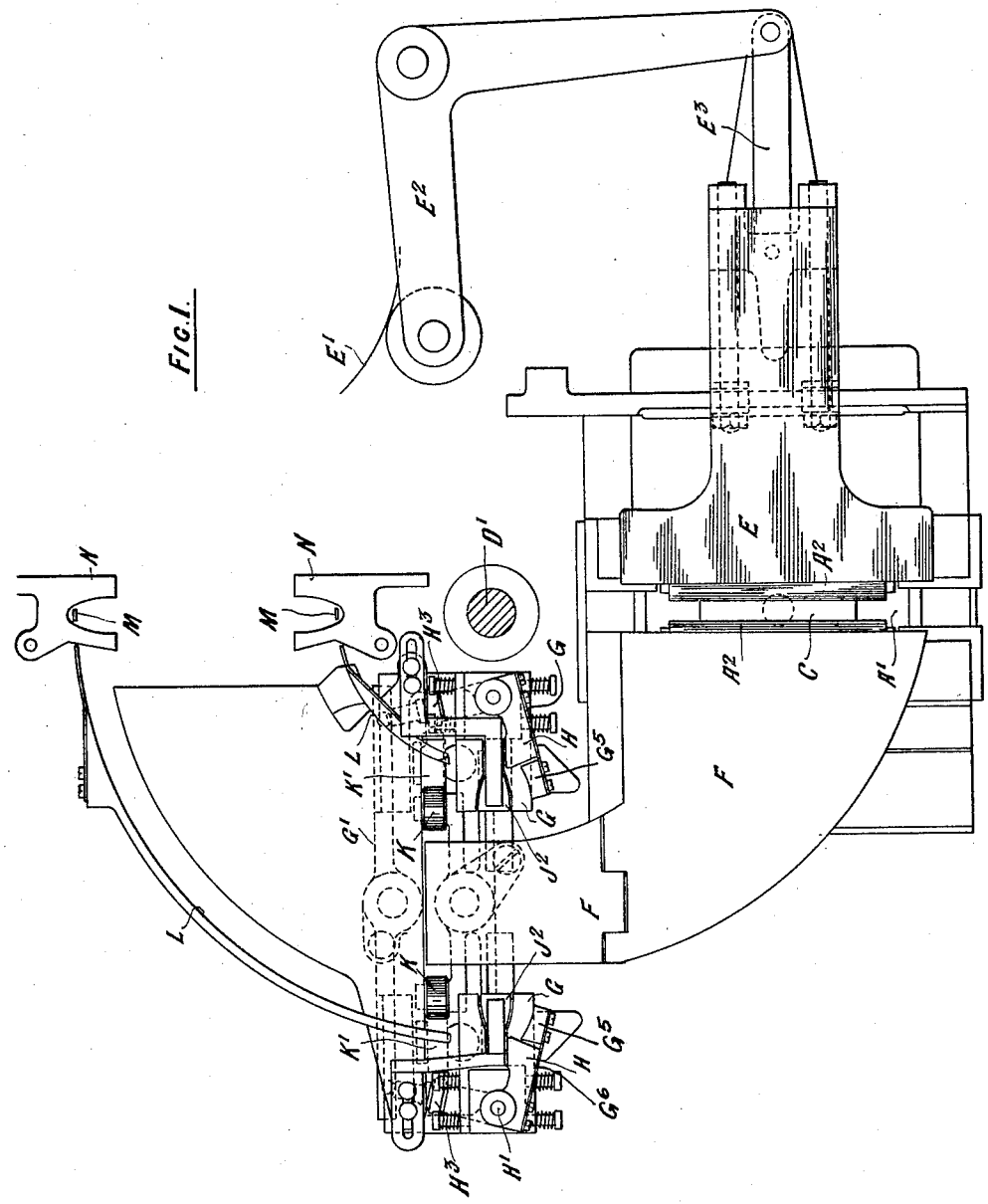
Frederick Grover
Inventor

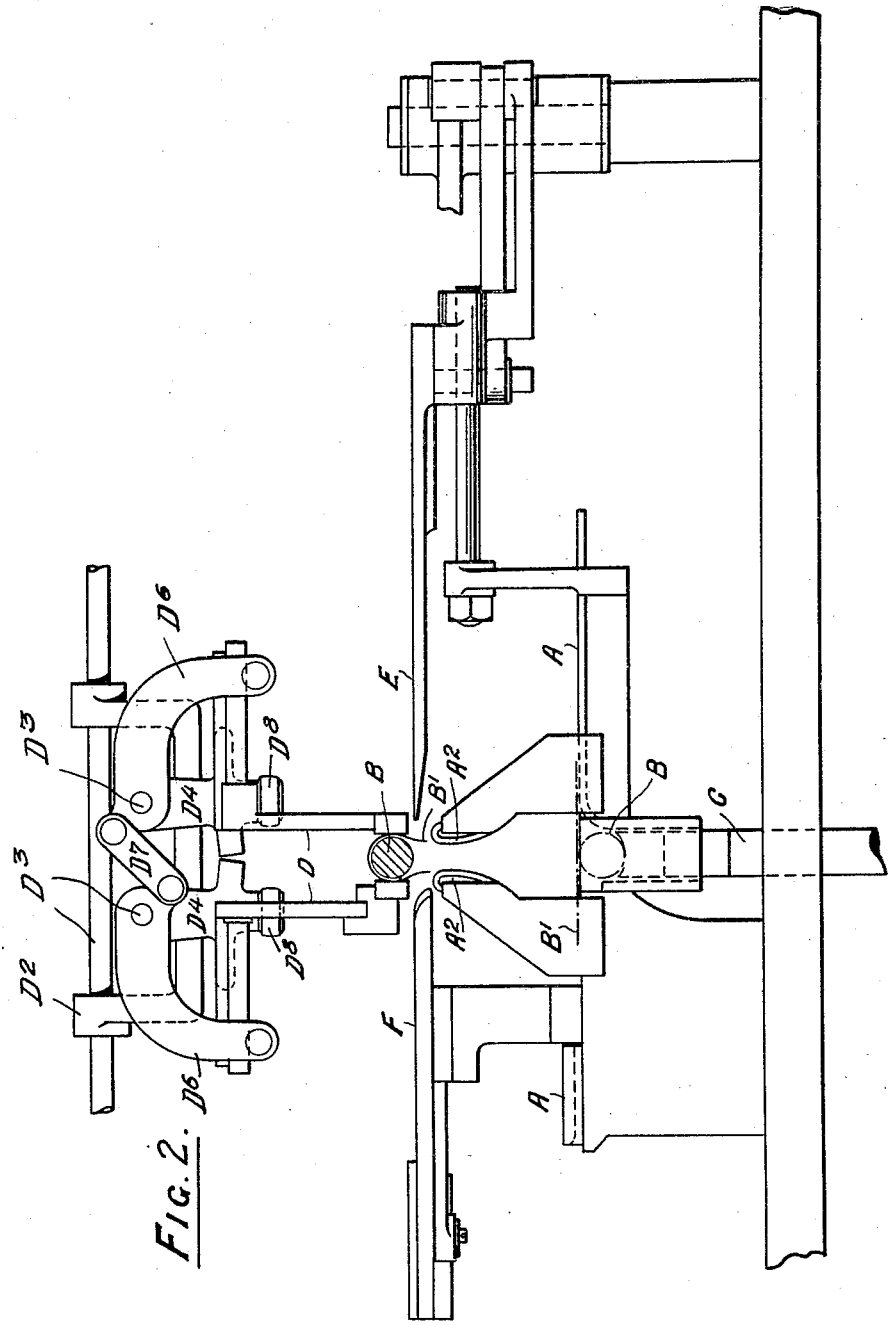

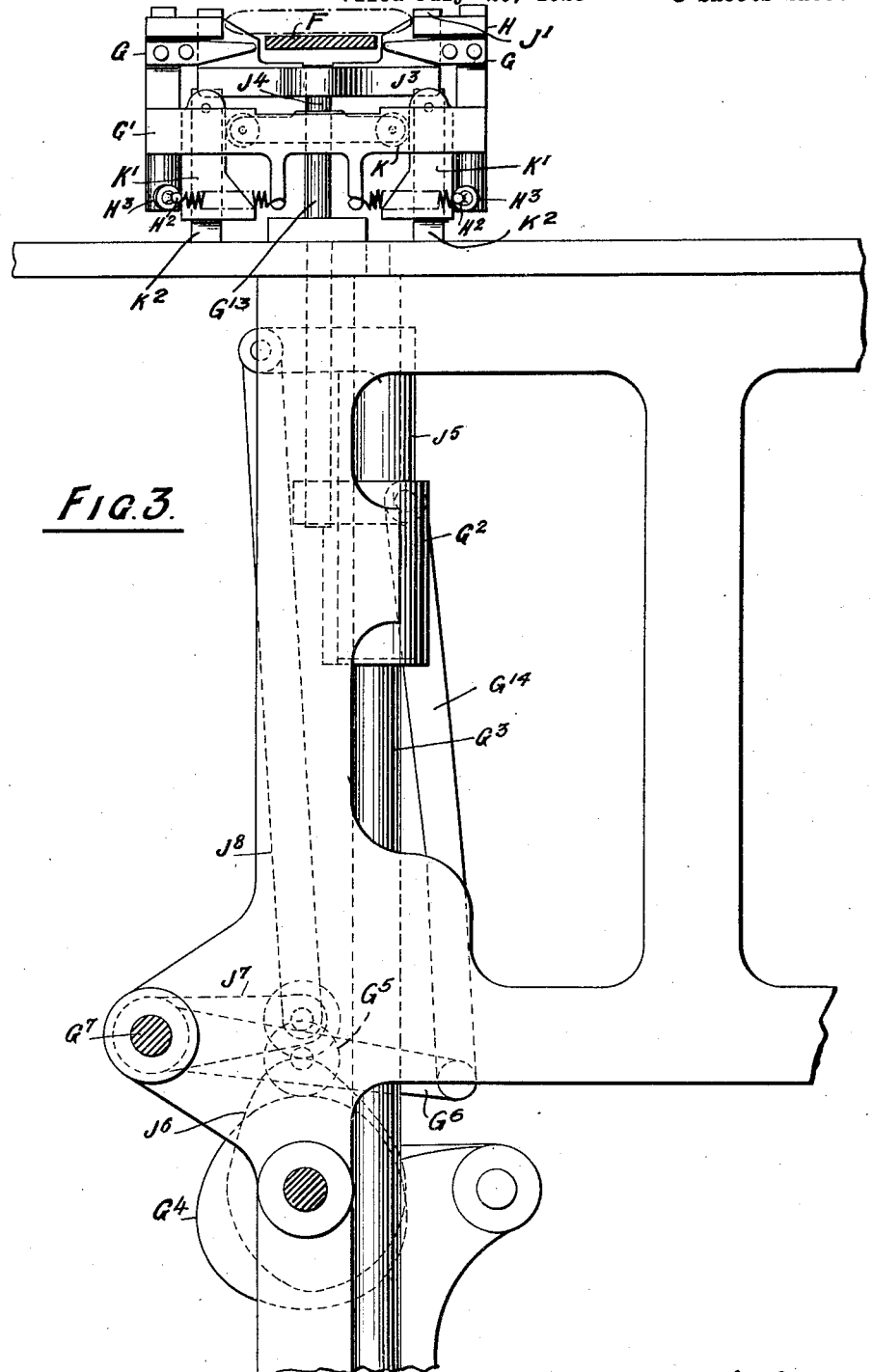

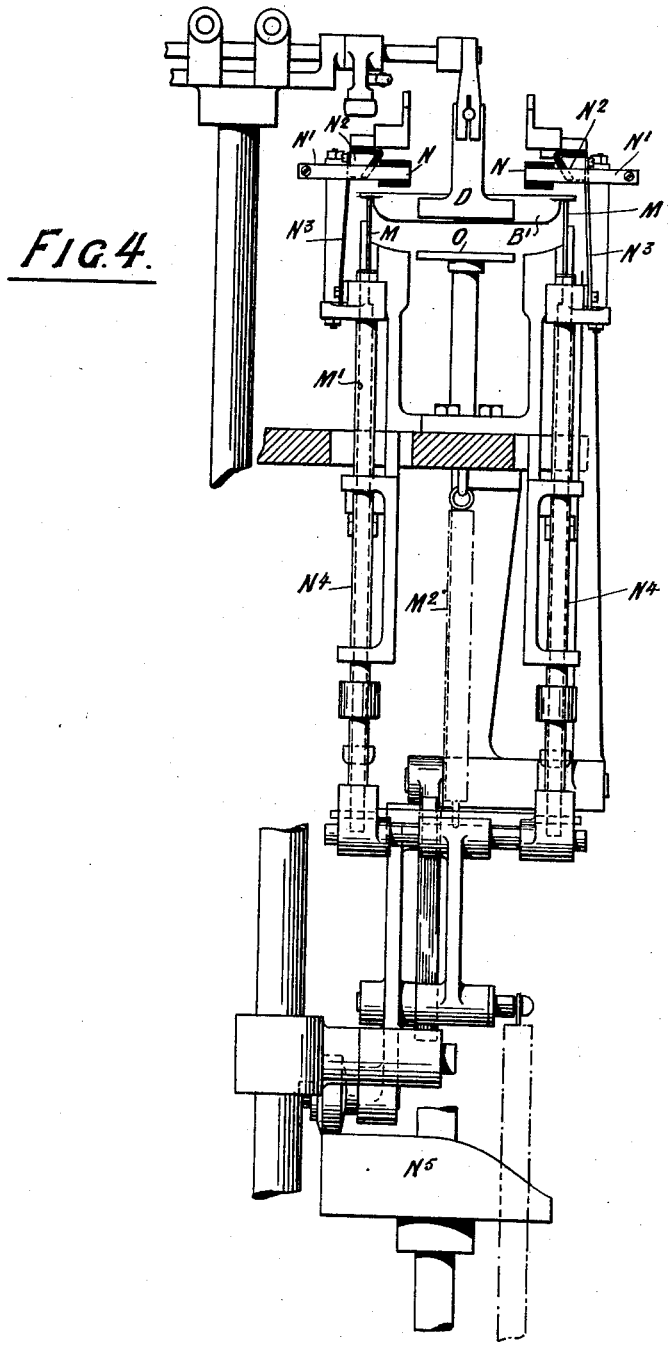

June 23, 1931.   F. GROVER   1,811,751
MACHINE FOR WRAPPING CIGARS AND OTHER ELONGATED BODIES
Filed July 25, 1928   8 Sheets-Sheet 5
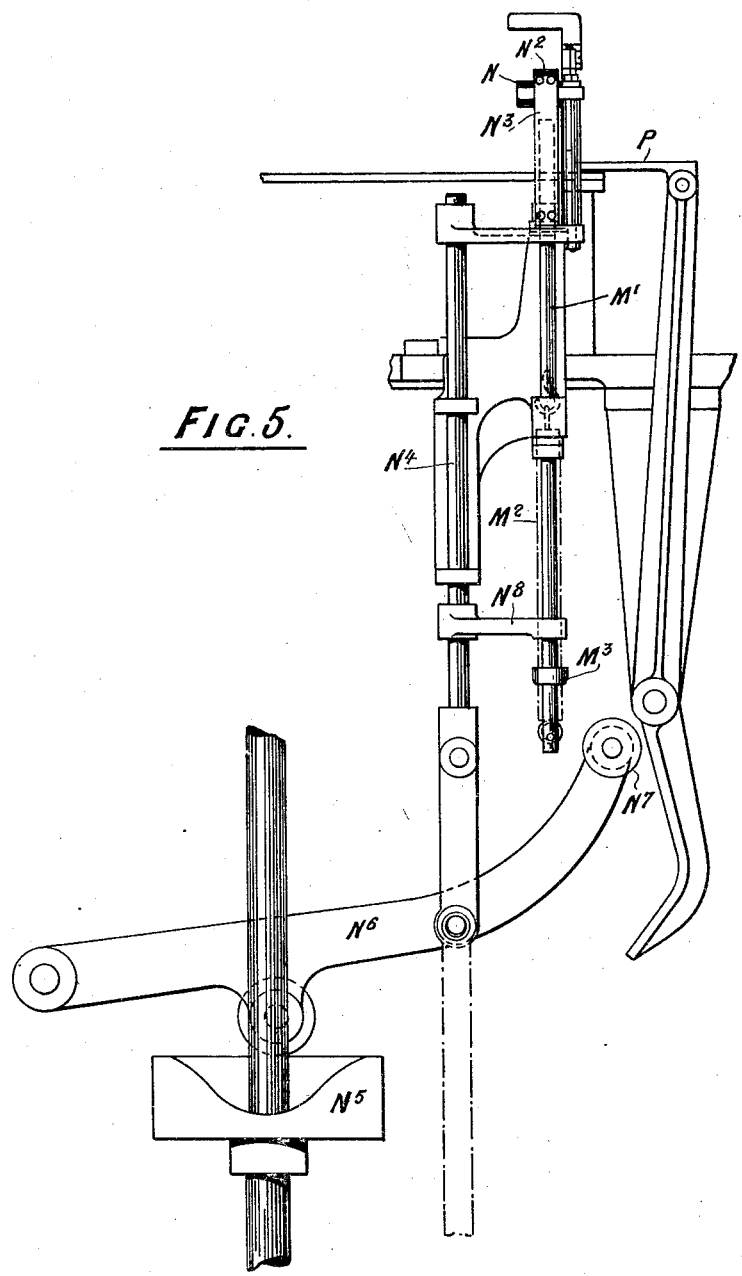

June 23, 1931.  F. GROVER  1,811,751
MACHINE FOR WRAPPING CIGARS AND OTHER ELONGATED BODIES
Filed July 25, 1928   8 Sheets-Sheet 6
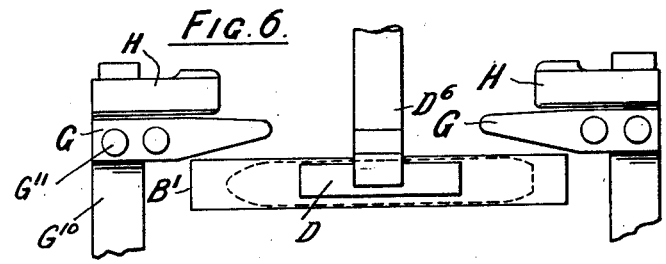
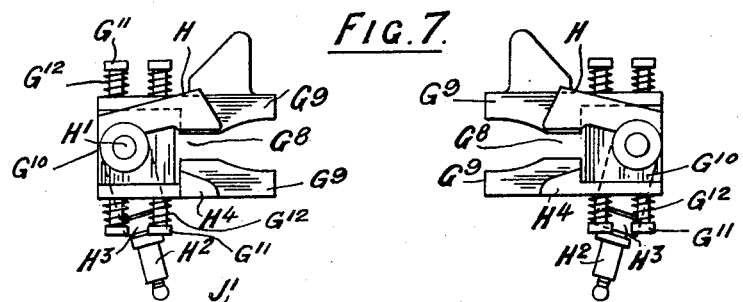
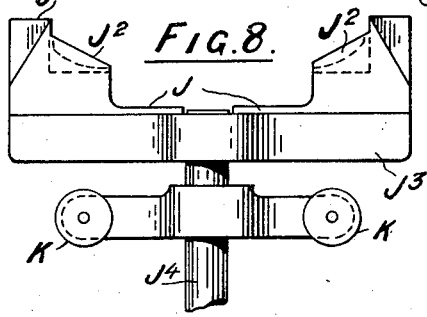
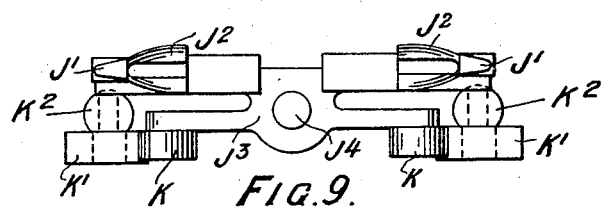
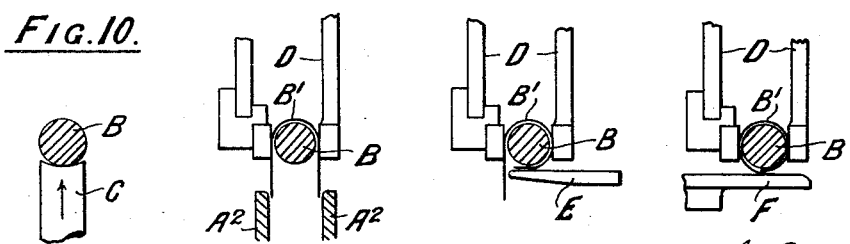

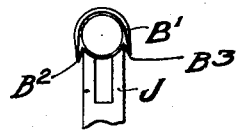
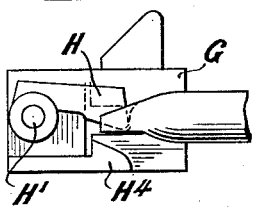
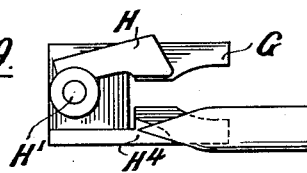
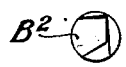
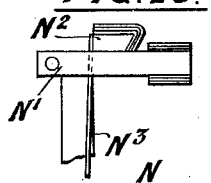
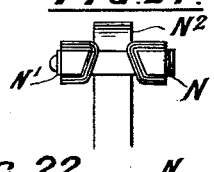
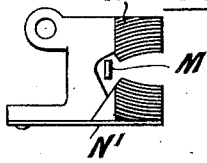
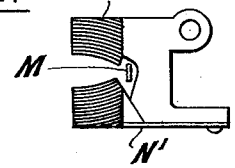
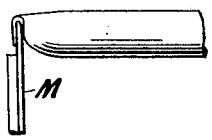
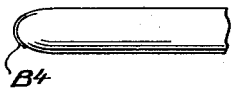

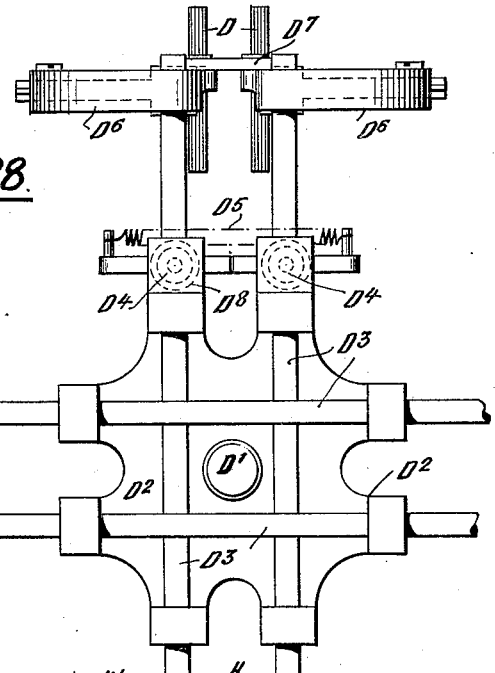

Patented June 23, 1931

1,811,751

UNITED STATES PATENT OFFICE

FREDERICK GROVER, OF LEEDS, ENGLAND, ASSIGNOR TO THE FORGROVE MACHINERY COMPANY LIMITED, OF LEEDS, ENGLAND

MACHINE FOR WRAPPING CIGARS AND OTHER ELONGATED BODIES

Application filed July 25, 1928, Serial No. 295,127, and in Great Britain August 16, 1927.

When wrapping cylindrical objects terminating in conical ends, the cone being truncated or complete, it is necessary to pleat or form gussets at both ends of the wrapper after it has been folded round the object in tubular formation, so that the conical ends shall be neatly covered by the wrapper; for by this means the excess area of the ends of the wrapper is neatly disposed around the conical ends so as to lie snugly about the cones.

The object of this invention is to provide a wrapping mechanism which will form the necessary pleats and complete the wrapping in a tight form without putting undue strain upon the object being wrapped. This is particularly essential when wrapping cigars because of the outer tobacco leaf, which must not be cracked.

According to this invention the elongated object to be wrapped, which may be a cigar having tapered or truncated ends, is traversed relatively to a wrapper which is supported by longitudinal supports such as a slotted table, in such a manner that the wrapper is formed into a trough with its sides projecting in parallel form on opposite sides of the object. These sides are then folded one over the other so that the object is contained in a cylindrical wrapper with the tubular ends projecting beyond the object. Spring grippers now grip and hold the sides of the object in its tubular wrapper, while forked end pieces by a relative lateral movement opposed by central concave projections move in opposite directions with the wrapper between them and pleat the projecting tubular ends of the wrapper thus forming longitudinal ears resting snugly against the conical ends of the object. Lateral fingers then turn in one ear of each pair of ears at each end of the wrapper and a further relative lateral movement between the wrapper and a finger turns over the other ear at each end against the first turned over ear leaving a triple fold projecting at each end consisting of upper and lower thickness of the tubular ends with superposed ears folded over against the other. These pointed projecting ends are then folded by the cross bending action between inner supporting members and outer folding members having relatively opposite movement.

In order that this invention may be clearly understood reference is made to the accompanying drawings in which an example of construction of a wrapping machine according to this invention is illustrated in the various views:—

Fig. 1 is a plan view of so much of a machine for wrapping cigars and other elongated bodies as is required to illustrate the construction of the example of this invention.

Fig. 2 is a partial side elevation of the portion of the mechanism with the object, hereinafter termed the cigar, shown in the first position in the process of being wrapped in tubular form.

Fig. 3 is an elevation and drawn to a smaller scale, with the cigar in the second position, in which the projecting tubular ends of the wrapper are folded and partly tucked into position over the ends of the cigar.

Fig. 4 is a sectional view of the mechanism in the third folding position where the folds of the ends of the wrapper are completed, and Fig. 5 is an elevation at right angles to Fig. 4. Both these figures show the cigar immediately prior to folding down the last projecting portion of the wrapper.

Figs. 6, 7, 8, 9, 10, 11, 12, 13, 14, 15, 16, 17, 18, 19, 20, 21, 22, 23, 24, 25, 26 and 27 are detail views which will be referred to hereafter.

Fig. 28 is a plan view of one pair of grippers showing the means of carrying them, and Fig. 29 is a side elevation at right angles to Fig. 3 showing means of carrying the fork end pieces referred to.

In the machine illustrated in the accompanying drawings the wrapping material is fed from a reel by any known means and is cut off to the required size and deposited on a horizontal table (Fig. 2) situated above the cigar to be wrapped. The foil or other wrapper-supporting table A is formed with an opening $A^1$ in it to allow the cigar B to pass upwards through the table and meet the wrapper $B^1$. The cigar is lifted by a plunger C on to which successive cigars are fed either by hand or by any mechanical means one during each cycle of the machine, thus maintaining the supply. Similarly, successive wrappers $B^1$ are fed to time in with the uprising of the plunger C. When the plunger C has lifted the cigar until it meets the wraper it continues to rise and so carries the cigar and wrapper past two side folding blades $A^2$ situated above the opening $A^1$ and carried by supports from the table A which movement causes the wrapper $B^1$ to form like an inverted U about the cigar.

Spring grippers D carried by a rotary turret head (not shown) are timed to open and receive the cigar with its wrapper and then close and carry them to another position, (see Fig. 2) the turret head moving in a circular path about the centre $D^1$, after the plunger C has retired downwards to receive another cigar. The turret head carrying the grippers D (shown in plan view at Fig. 28) consists of a bracket $D^2$ fitted with four rods $D^3$ arranged in pairs at right angles to each other and capable of a rocking movement imparted to them by means of depending arms $D^4$ fixed to the rods $D^3$ arranged in pairs elastically drawn together by springs $D^5$. Each pair of rods $D^3$ carry, at the outer ends, arms $D^6$ which carry the gripper jaws D, the arms $D^6$ being connected by a link $D^7$. The gripper jaws are opened, when required, through the medium of a wedge-like cam (not shown) adapted to enter at predetermined times between the depending arms $D^4$ which carry rollers $D^8$, and force them apart against the action of the springs $D^5$, thereby rocking the rods $D^3$ and opening the gripper jaws D. During the passage from the receiving position to the second position the downwardly projecting sides of the wrapper are folded under the cigar by a rear blade E which moves in the same direction as the cigar but at a higher speed, so as to catch up to it and fold the rear side of the wrapper under. The blade E receives a reciprocating movement from a cam $E^1$ and lever and link connections $E^2$, $E^3$ (see Fig. 1). When the rear side of the wrapper is folded under the forward side of the wrapper impinges on a stationary plate F, thus folding the further side under the first formed fold. In this manner the cigar is surrounded by the wrapper in tubular form with the tubular ends of the wrapper projecting beyond the conical ends of the cigar. The positions of the cigar and wrapper occupied during the above described movements are shown diagrammatically at Figs. 10, 11, 12 and 13. The stationary plate F which forms the second underfold retains it by reason of its extension in the direction of the wrapper's movement to its second position and the said stationary plate is narrowed at the second position of the cigar sufficiently to permit end folders to function, whilst it still retains the last underfold in position by pressing lightly against the central portion of the wrapped cigar.

When the cigar with the tubular projecting wrapper arrives at the second position it is situated centrally under two forked pieces G (see Figs. 6 and 7) one at each end of the tubular wrapper. The forks extend inwardly towards the centre of the wrapper and are made to conform with the shape of the conical ends of the cigar, and to extend inwardly a short distance along the cylindrical portion of the cigar. These two forks G comprise jaws $G^9$ elastically held to vertical blocks $G^{10}$ by means of pins $G^{11}$ and springs $G^{12}$. The vertical blocks $G^{10}$ are attached to a plate $G^1$ carried by a vertical rod $G^{13}$ (see Figs. 3 and 29) fixed to a sleeve $G^2$ which has vertical movements on a fixed rod $G^3$ the sleeve being moved vertically up or down according to requirements by a cam $G^4$ acting upon a bowl $G^5$ carried on the arm $G^6$ pivoted at $G^7$ and connected by a link $G^{14}$ with the sleeve $G^2$. The movement of these forks G is such that they can pass vertically entirely past the ends of the wrapper into a position clear of the cigar and wrapper which can then pass forward over the forks when required.

At the apex of the conical ends each fork is extended by a narrow gap $G^8$ at its root, which gap terminates about the end of the tubular wrapper. The jaws $G^9$ comprising each fork are yieldingly mounted with springs so that each fork can widen if the object is too large to pass through the fork.

Having reference to the direction of motion of the cigar from one position to another, the rear arm of each fork carries a pivoted tucking finger H which stands above the top plane of the fork and is therefore unobstructed in its pivotal movement. The pivots $H^1$ of these tucking fingers extend vertically downwards through the block $G^{10}$ and carry at their lower ends horizontally projecting arms $H^2$. The descent of the forks below the cigar brings the tucking fingers H in line with the tubular end of the wrapper, so that by giving the fingers pivotal movement the ends of the wrapper may be folded by them.

The forked end pieces G above described work in conjunction with a vertically moving tucking piece J forming female and male dies. Upon the arrival of the cigar at the second position beneath the forked pieces the vertically moving tucking piece is situated centrally beneath the cigar. One end of this piece will be described, it being understood that the other end is of similar construction. Imagine a block of plastic material so shaped that it nearly fills the fork already described, and is, say 1½" deep. The fork could then pass completely over such a block. Now imagine that the cigar to be wrapped is taken without the wrapper and pressed down centrally into the plastic material until the cylindrical part at the centre of the cigar is level with the upstanding projection left at the end or root of the fork. Let the excess of material be removed so that the block is its original width. The resulting shape of this vertically moving piece will be an upstanding projection $J^1$ capable of passing up between the narrow part $G^8$ of the fork and extending from the base of this projection is a concave portion $J^2$ splaying out somewhat V-shaped adapted to fit the conical ends of the cigar, the top edges of the V coming to a feather edge. The two ends of this tucking piece J are carried by a bar $J^3$ mounted on a rod $J^4$ attached to a sleeve $J^5$ which has vertical movements on the rod $G^3$ imparted to it by means of a cam $J^6$, lever $J^7$, and link $J^8$. When the cigar has arrived beneath the forked pieces G the tucking pieces J rise and simultaneously the forked pieces descend and by the combined action there is a stroking-down of the wrapper from above, and a simultaneous thrust-up from below, producing at each end of the wrapper a pleat or gusset formation (see Figs. 14 and 15) with side ears $B^2$ $B^3$ depending but lying snugly against the conical form of the cigar (see Fig. 16). It is the V-shaped edges of the concave portions $J^2$ when they move upwards that produce the pleats in the tubular ends of the wrapper at each end; whilst at the same time the fork pieces G are moving downwards surrounding the tucking piece J. This tucking piece is made in suitable metal, and the V edges trimmed off to the angle required. It will be observed that the pleating is done by the V edges of the tucking piece J whilst the cigar is supported by the tucking piece and is not itself subject to impacts likely to crack a delicate surface.

When the pleats are formed, by the continued downward movement of the forks G and the upward movement of the tucking piece J, the said tucking piece descends and this movement causes a pivotal movement of the pivoted tucking fingers H carried above the rear legs of the forks already described (see Fig. 17). This movement of the tucking fingers H is effected by rollers K carried by arms fixed to the rod $J^4$ and acting during the descent of the tucking piece J upon cam surfaces formed on pivoted tumblers $K^1$. The tumblers $K^1$ are pivotally mounted on pillars $K^2$ fixed to the frame of the machine (see Figs. 3, 8 and 9) upon the outer surfaces of which tumblers, rollers $H^3$ bear. The rollers $H^3$ are mounted on the arms $H^2$ carried by the pivots $H^1$ of the fingers H, and are held in contact with the outer faces of the tumblers $K^1$ by springs attached to the arms $H^2$ and to the extensions from the plate $G^1$.

Each tucking finger, when operated, slides over the upper surfaces of the forks G and acts upon the gusset-shaped fold formed at each end of the wrapper and doubles in the ear to lie against the surface of the cigar being wrapped (see Fig. 18). Whilst the finger H is operating and retaining the fold it has made, the cigar still held by the above-mentioned grippers is moved into its third position. At the commencement of such movement the forward ear $B^3$ at each end of the wrapper is doubled back to lie over the previously-made fold by passing over raised portions $H^4$ on the forked pieces G (see Figs. 19, 20 and 21).

The tucking finger H may carry an extension $H^5$, shown at Figure 1. This extension is, when used, carried by a thin metal spring $H^6$ attached to the finger H and assists in pressing the wrapper up against the cigar.

The folds made in the wrapper are retained in position during the traverse of the cigar in the grippers to its third position by means of vertical guide plates or blades L rigidly attached to the frame of the machine, which plates extend from the second position of the cigar, already described, to the third position. The cigar is carried by the grippers between these plates L, the folded ends being retained in position by the vertical faces of the said plates L.

At this time the cigar is completely enclosed in the wrapper, but the central ears $B^4$ resulting from the gusset and ear folds are left projecting straight out from each end. It is now necessary to fold down these projecting ends which consist of several thicknesses of wrapper and are therefore somewhat stiff and require considerable force to fold them down. It is important that the forces exerted in breaking down the resistance of these folds shall not be resisted by the cigar being wrapped.

With the above objects in view, the retaining end blades L already mentioned are supplanted at the third position by supporting blades M about the width of the end fold capable of a short vertical motion and held up by a spring. Such blades are situated at each end of the partially complete wrap, (see Figs. 4 and 5).

The supporting blades M are carried on vertical rods $M^1$ and are held in their raised position by a spring $M^2$. It will be observed that when the wrapped cigar arrives at its third position above these end blades M the said blades are close up against each folded end and under the extending part of the wrapper which still requires to be turned down. The cigar, being light, is practically supported like a beam on these two blades M when the grippers D that hold the cigar are released. Vertically moving forked pieces N made to span the formation of the wrapper round the conical ends of the cigar, are provided (shown diagrammatically at Fig. 1 and in detail at Figs. 22, 23 and 24). These forked pieces consist of a block N upon which is formed one arm of the fork, the other arm N¹ of the fork being carried by a spring attached to the block N in such a manner that the fork will expand and give a yielding pressure when passing over the wrapped cigar. Each forked piece N is preferably provided with a central pressing finger N² supported upon a vertically extending spring arm N³ (see Figs. 23 and 24). The faces of the arms N and N¹ and also N² are preferably lined with felt or plush. These forked pieces N and the pressing fingers N² are carried by rods N⁴ which receive vertical movements from the cam N⁵ and lever N⁶. The rods N⁴ carry projecting fingers N⁸ which embrace the rods M¹ and upon the descent of the rods N⁴, contact with collars M³ and draw down the blades M against the action of the spring M². When the grippers are opened to receive the cigar and wrapper in the first position by the means before described, the gripper carried at the other end of the same pair of rods D³ also open to release the wrapped cigar, which has arrived at its third position. Just prior to the release of the wrapped cigar by the grippers the forks N descend and the longitudinally extending ends of the wrappers are doubled over the upstanding blades M and tightly pressed against them (see Figs. 25 and 26). The downward movement of the blades M and surrounding forked pieces carries the completely wrapped cigar clear of the open grippers on to a horizontal support O or shelf shaped for the wrapped cigar to rest upon. The forked pieces N and blades M then pass completely down clear of the wrapped cigar which is left resting on the before-mentioned shelf O. The central spring mounted finger N² in its downward passage finally presses the end folds tightly into contact with the conical ends of the cigar (see Fig. 27).

A suitable chute is provided down which the cigar can slide on to a transport belt for packing. A suitable moving finger P is provided to dislodge the wrapped cigar from the shelf and discharge it down the chute, this finger P being operated by the bowl N⁷ carried on the lever N⁶.

What I claim as my invention and desire to secure by Letters Patent is:—

1. A machine for wrapping cigars and other elongated bodies, comprising in combination means for enclosing the body in a tubular wrapper the ends of which wrapper project beyond the body, means for holding the body thus enclosed in the tubular wrapper, male and female dies located at opposite ends of the tubular wrapper, means for approaching the male and female dies towards each other transversely of the body, means for distancing such male and female dies after the under ends of the wrapper have been bent upwards to form two side ears, a transversely moving finger adapted to turn inwardly one side ear fold of the two side ear folds formed by the dies at each end of the body, means for turning inwardly the other side ear fold in the opposite direction to overlap the first side ear fold, and means for turning down the central projecting ear fold formed by the turning in of the side ear folds.

2. A machine for wrapping cigars and other elongated bodies, comprising in combination means for enclosing the body in a tubular wrapper the ends of which wrapper project beyond the body, means for holding the body thus enclosed in the tubular wrapper, male and female dies located at opposite ends of the tubular wrapper, means for approaching the male and female dies towards each other transversely of the body, means for distancing such male and female dies after the under ends of the wrapper have been bent upwards to form two side ears, a transversely moving finger adapted to turn inwardly one side ear fold of the two side ear folds formed by the dies at each end of the body, means for traversing the mechanism holding the cigar, a stationary blade against which the other side ear fold contacts adapted to turn said other side ear inwardly in the opposite direction to overlap the first side ear fold, and means for turning down the central projecting ear fold formed by the turning in of the side ear folds.

3. A machine for wrapping cigars and other elongated bodies, comprising in combination, means for enclosing the body in a tubular wrapper the ends of which wrapper project beyond the body, means for holding the body thus enclosed in the tubular wrapper, tucking pieces located at opposite ends of the tubular wrapper adapted to form gussets in the ends of said wrapper, forked wiping pieces located at opposite ends of the tubular wrapper adapted to wipe down the sides of the ends of the wrapper to form with said gussets two side ears, means for moving the tucking pieces and forked wiping pieces relatively to each other transversely of the body to form the two side ears, means for turning inwardly one of the side ears at each end of the body, means for turning inwardly the other side ears in an opposite direction to overlap the first side ears and means for turning down the central projecting ear formed by the turning in of the said side ear folds at each end of the wrapper.

4. A machine for wrapping cigars and other elongated bodies, comprising in combination, means for enclosing the body in a tubular wrapper the ends of which wrapper project beyond the body, means for holding the body thus enclosed in the tubular wrapper, upwardly movable tucking pieces located below the body at opposite ends of the tubular wrapper for moving parts of the ends of said wrapper upwardly to form gussets in the ends of said wrapper, downwardly movable forked wiping pieces located at opposite ends of the tubular wrapper for forming with said gussets two downwardly depending side ears at each end, means for moving the tucking pieces and forked wiping pieces upwardly and downwardly relatively to each other transversely of the body to form two side ears, transversely moving fingers for turning inwardly one of the side ears at each end of the body, means for turning inwardly the other side ear at each end in an opposite direction to overlap the first side ear, and means for turning down the central projecting ear formed by the turning in of the said ear folds at each end of the wrapper.

5. A machine for wrapping cigars and other elongated bodies, comprising in combination, means for enclosing the body in a tubular wrapper the ends of which wrapper project beyond the body, means for holding the body thus enclosed in the tubular wrapper, tucking pieces located at opposite ends of the tubular wrapper for forming gussets in the ends of the wrapper, forked wiping pieces located at opposite ends of the tubular wrapper adapted to wipe the sides of the ends of the wrapper to form two side ears at each end of the wrapper, means for yieldingly mounting said forked wiping pieces to allow adjustment of said pieces to suit variations in the size of the body, means for moving the tucking pieces and forked wiping pieces past each other transversely of the body to form the said side ears, means for turning inwardly one of the side ears at each end of the body, means for turning inwardly the other side ear in an opposite direction to overlap the first side ear and means for turning down the central projecting ear formed by the turning in of the said ear folds at each end of the wrapper.

6. A machine for wrapping cigars and other elongated bodies, comprising in combination, means for enclosing the body in a tubular wrapper the ends of which wrapper project beyond the body, means for holding the body thus enclosed in the tubular wrapper, rigid tucking pieces located at opposite ends of the tubular wrapper for forming gussets in the ends of the wrapper, yieldingly mounted forked wiping pieces located at opposite ends of the wrapper adapted to pass around the rigid tucking pieces to form with said tucking pieces two side ears on each end of the wrapper, means for moving the tucking pieces and forked wiping pieces past each other transversely of the body to form the two side ears, transversely moving fingers for turning inwardly one of the side ears at each end of the body, means for moving the means holding said body, intercepting members for turning inwardly the other side ears at each end of the body in an opposite direction to overlap the first side ears, means for supporting the base of the central projecting ear formed by the turning in of the said side ear folds at each end of the body and means for turning down said central projecting ear folds.

In witness whereof I have hereunto set my hand.

FREDERICK GROVER.